(12) United States Patent
Chen (10) Patent No.: US 7,637,638 B2
(45) Date of Patent: Dec. 29, 2009

(54) LIGHTING APPARATUS

(75) Inventor: Kuei-Fang Chen, No. 59, Lane 496, Ninpu S. Rd., Hsinchu (TW)

(73) Assignee: Kuei-Fang Chen, Hsinchu (TW)

( * ) Notice: Subject to any disclaimer, the term of this patent is extended or adjusted under 35 U.S.C. 154(b) by 0 days.

(21) Appl. No.: 12/277,726

(22) Filed: Nov. 25, 2008

(65) Prior Publication Data

US 2009/0073681 A1    Mar. 19, 2009

(51) Int. Cl.
*F21V 29/00* (2006.01)
(52) U.S. Cl. .................. 362/294; 362/218; 362/373
(58) Field of Classification Search ............. 362/218, 362/219, 223, 225, 217.02, 217.05, 235, 362/249.01, 249.02, 249.06, 249.14, 431, 362/294, 373
See application file for complete search history.

(56) References Cited

U.S. PATENT DOCUMENTS

| | | | |
|---|---|---|---|
| 5,857,767 A * | 1/1999 | Hochstein | 362/294 |
| 6,871,993 B2 * | 3/2005 | Hecht | 362/555 |
| 7,234,844 B2 * | 6/2007 | Bolta et al. | 362/294 |
| 2004/0120152 A1 * | 6/2004 | Bolta et al. | 362/294 |
| 2008/0019125 A1 * | 1/2008 | Hsu et al. | 362/218 |
| 2008/0062691 A1 * | 3/2008 | Villard et al. | 362/252 |
| 2008/0285265 A1 * | 11/2008 | Boissevain | 362/218 |

* cited by examiner

*Primary Examiner*—Thomas M Sember
(74) *Attorney, Agent, or Firm*—Harry K. Ahn; Abelman Frayne & Schwab (57) ABSTRACT

A lighting apparatus includes a heat-dissipating unit, a circuit board unit, and a lighting unit. The heat-dissipating unit includes a base wall that extends in a longitudinal direction. The base wall has a top side and a bottom side formed with a convex surface portion. The circuit board unit is disposed on the base wall. The lighting unit includes an outer pair of light emitting sets and at least one other light emitting set disposed between the outer pair of the light emitting sets. The light emitting sets are disposed on the convex surface portion and are coupled electrically to the circuit board unit. Each of the light emitting sets has a plurality of light emitting units that are spaced apart from each other. A number of the light emitting units in each light emitting set in the outer pair is larger than a number of the light emitting units in each of the other light emitting sets.

7 Claims, 10 Drawing Sheets

LIGHTING APPARATUS

BACKGROUND OF THE INVENTION

1. Field of the Invention

This invention relates to a lighting apparatus, more particularly to a lighting apparatus capable of reducing variance in intensity of light at different points of an illuminated area.

2. Description of the Related Art

Figure 1:
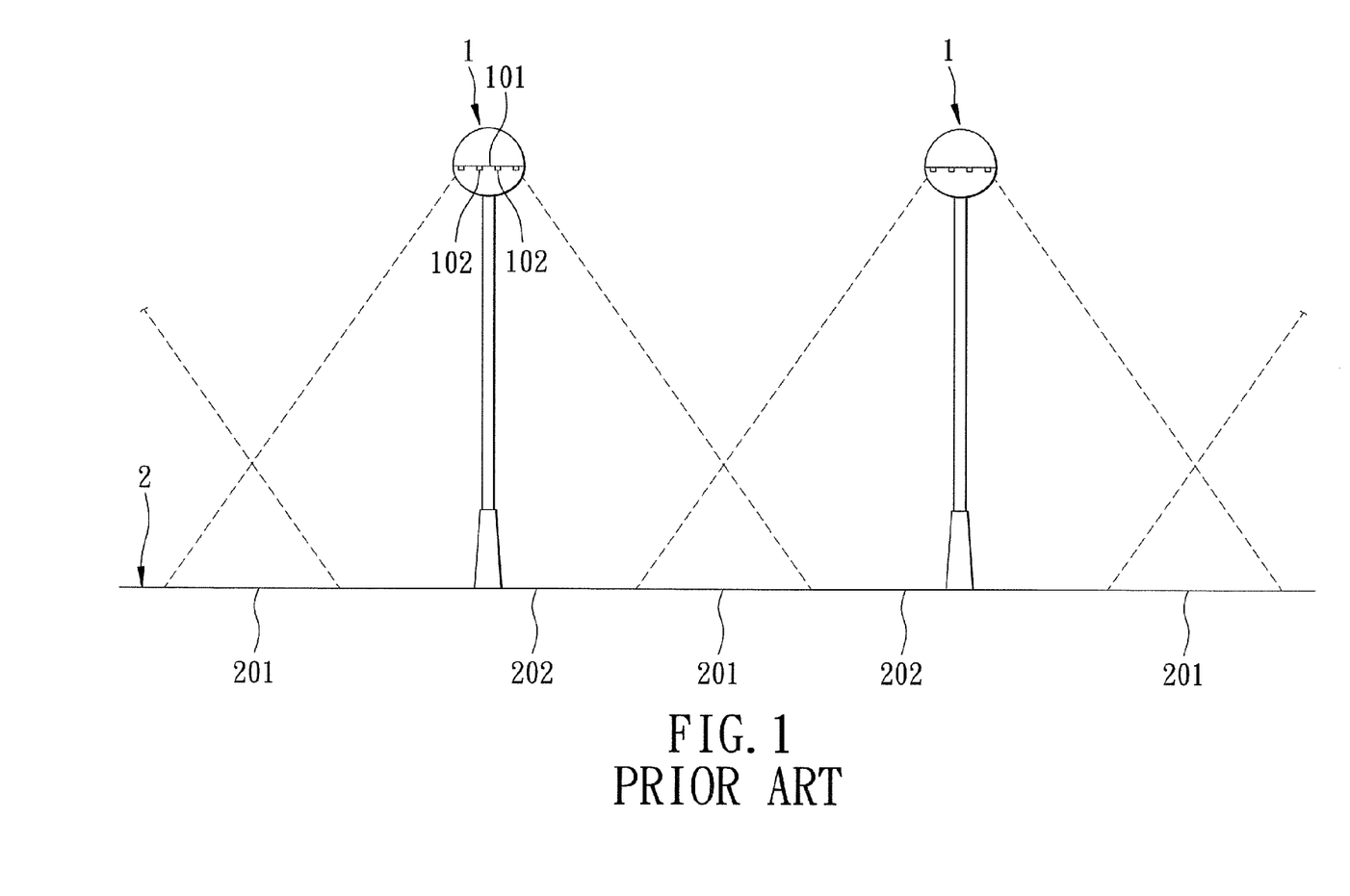
FIG. 1 is a schematic diagram showing two conventional adjacent lighting apparatuses in a state of projecting light onto a street.
Figure 2:
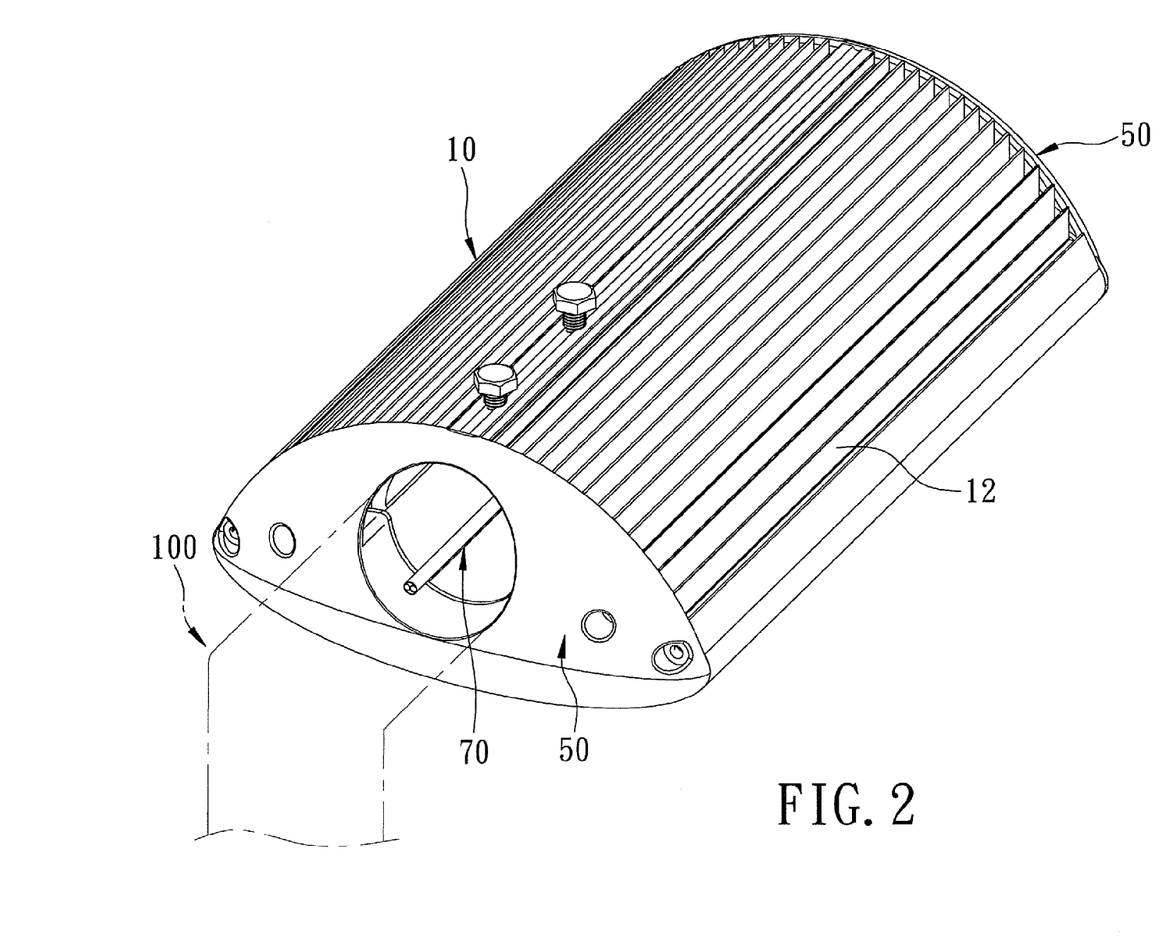
FIG. 2 is a perspective view of the first preferred embodiment of a lighting apparatus according to the present invention.
Figure 3:
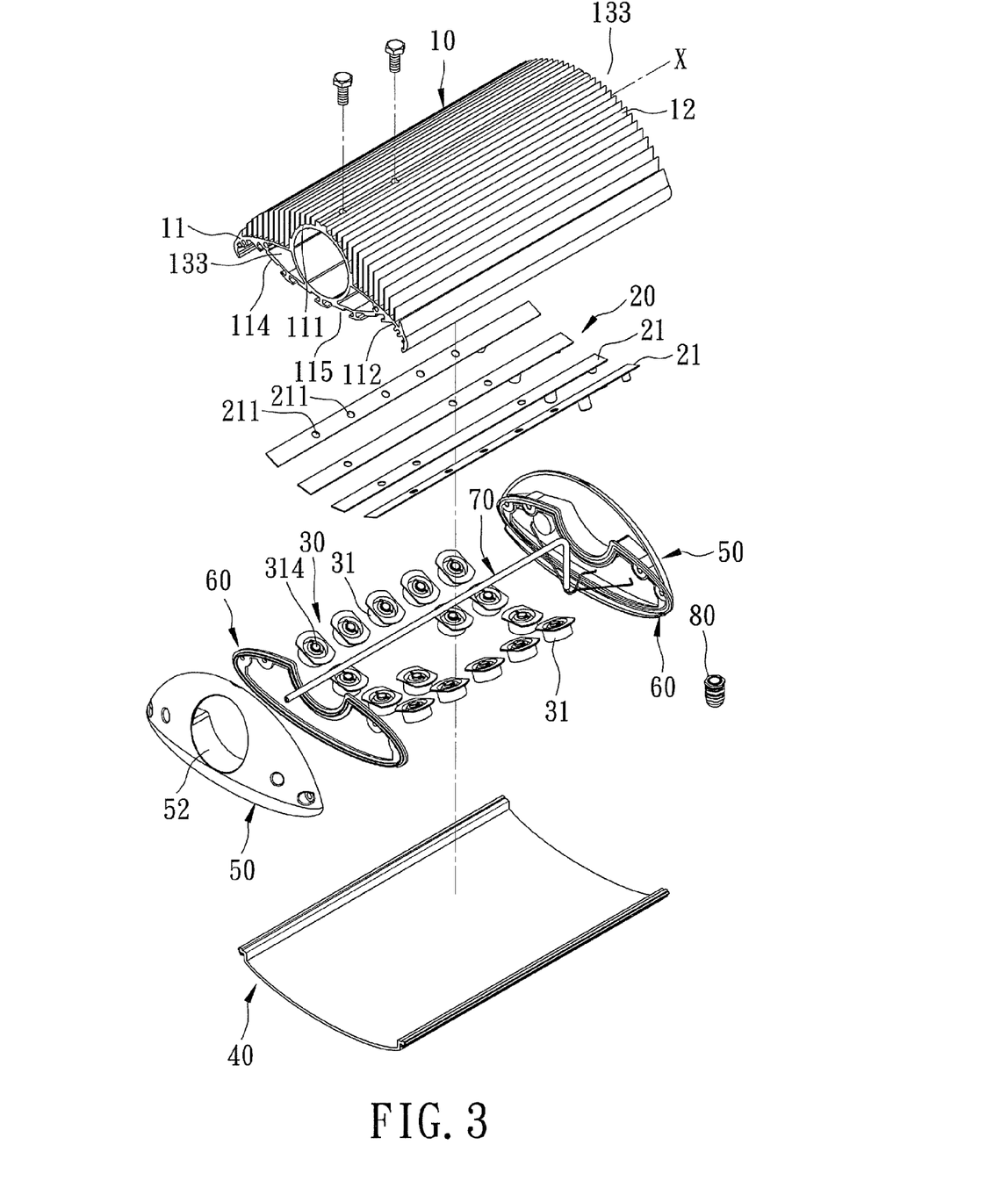
FIG. 3 is an exploded perspective view of the lighting apparatus shown in FIG. 2.

Referring to FIG. 1, a conventional lighting apparatus 1 (e.g., a street light) has a plurality of light emitting units (LEDs) 102 disposed on a flat mounting surface 101 thereof. The light emitting units 102 project light for illuminating a street 2.

A typical government regulation imposed on a street light installation requires two adjacent lighting apparatuses 1 mounted on the street 2 to be 30 meters apart. Each of the lighting apparatuses 1 is capable of projecting two distinctive illumination regions (a center region 202 and an outer region 201). The intensity (E) of the light outputted by the lighting apparatus 1 can be calculated using an equation ($E=F/4\pi R^2$), where F is the light flux and R is the distance. As can be seen from the equation, the relationship between parameters E and R is inversely proportional. Notably, the farther is the distance from the lighting apparatus (denoted by R), the weaker will be the intensity of the light (denoted by E) illuminated on a surface. Therefore, the light at the center region 202 will be brighter than that at the outer region 201. Further, according to the government regulation, a light contrast ratio between these two regions should not be less than 0.3.

However, the conventional lighting apparatus 1 often provides a light contrast ratio of less than 0.3, which means that there is an unacceptably large variance in intensity of light between the center and outer regions 202, 201. If a driver is driving at a high speed, the presence of the large variance in light intensity at relatively short distances (30 m apart) can pose serious road safety concerns.

SUMMARY OF THE INVENTION

The object of the present invention is to provide a lighting apparatus capable of overcoming the above-mentioned drawbacks of the prior art.

According to this invention, a lighting apparatus includes a heat-dissipating unit, a circuit board unit, and a lighting unit. The heat-dissipating unit includes a base wall that extends in a longitudinal direction. The base wall has a top side and a bottom side formed with a convex surface portion that is opposite to the top side. The circuit board unit is disposed on the base wall. The lighting unit includes an outer pair of light emitting sets and at least one other light emitting set disposed between the outer pair of the light emitting sets. The light emitting sets of the lighting unit are disposed on the convex surface portion and are coupled electrically to the circuit board unit. Each of the light emitting sets of the lighting unit has a plurality of light emitting units that are spaced apart from each other in the longitudinal direction. A number of the light emitting units in each of the light emitting sets in the outer pair is larger than a number of the light emitting units in each of the at least one other light emitting set of the lighting unit.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Referring to FIGS. 2 to 6, the first preferred embodiment of a lighting apparatus according to the present invention is adapted for use on a lamp post 100 so as to project light onto a street 200. The lighting apparatus includes a heat-dissipating unit 10, a circuit board unit 20, a lighting unit 30, a light transmissible cover 40, a pair of side covers 50 each of which is formed with a bore 52, a pair of waterproofing seals 60, a power supply line 70, and a waterproof connector 80.

The heat-dissipating unit 10 includes a base wall 11 that extends in a longitudinal direction (X), and a plurality of heat-dissipating fins 12. The base wall 11 has a top side 111 and a bottom side 112 formed with a convex surface portion 114 that is opposite to the top side 111. The base wall 11 further has a pair of lateral ends 133 that extend between the top and bottom sides 111, 112 thereof and that are opposite to each other in the longitudinal direction, and a through hole 113 that extends from one of the lateral ends 133 to the other of the lateral ends 133 and that is defined by a hole-defining wall 134. The heat-dissipating fins 12 extend in the longitudinal direction (X) and project upwardly from the top side 111 of the base wall 11. The convex surface portion 114 is formed with a plurality of spaced-apart recesses 115 that extend in the longitudinal direction (X).

The circuit board unit 20 is disposed on the base wall 11 and includes a plurality of board strips 21. In this embodiment, there are four board strips 21, each of which is formed with a plurality of spaced-apart holes 211 and is disposed in a respective one of the recesses 115.

The lighting unit 30 includes an outer pair of light emitting sets and at least one other light emitting set disposed between the outer pair of the light emitting sets. The light emitting sets of the lighting unit 30 are disposed on the convex surface portion 114 and are coupled electrically to the circuit board unit 20. The light emitting sets are retained removably and respectively in the recesses 115 and abut respectively against the board strips 21 in the recesses 115 to establish electrical connection with the circuit board unit 20.

Figure 4:
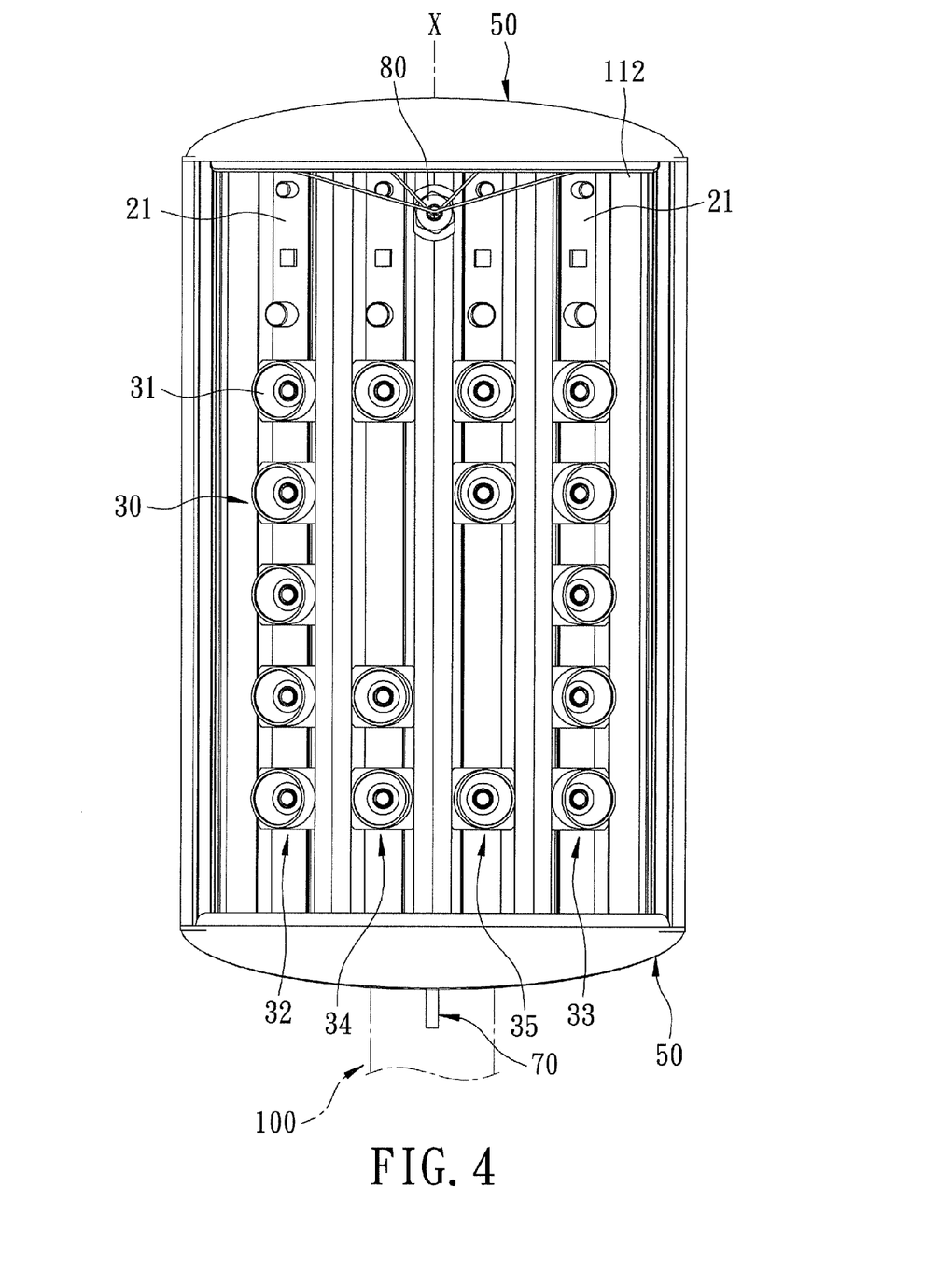
FIG. 4 is a schematic view of the first preferred embodiment to illustrate arrangement of light emitting sets in the lighting apparatus.

In this embodiment, as shown in FIG. 4, the outer pair of the light emitting sets are denoted as 32, 33, and the other light emitting sets disposed between the outer pair of the light emitting sets are first and second inner light emitting sets 34, 35. Each of the light emitting sets of the lighting unit 30 has a plurality of light emitting units 31 that are spaced apart from each other in the longitudinal direction (X), and that extend through the holes 211 in the board strips 21. Each of the light emitting units 31 includes a metal heat-dissipating plate 314 that contacts the convex surface portion 114 of the base wall 11 for enhancing the heat-dissipating efficiency. A number of the light emitting units 31 in each of the light emitting sets in the outer pair 32, 33 is larger than a number of the light emitting units 31 in each of the first and second inner light emitting sets 34, 35 of the lighting unit 30. In this embodiment, each of the light emitting sets in the outer pair 32, 33 has five of the light emitting units 31, and each of the first and second inner light emitting sets 34, 35 has three of the light emitting units 31. In addition, one of the light emitting units 31 of the first inner light emitting set 34 and two of the light emitting units 31 of the second inner light emitting set 35 are disposed on one side of an imaginary line transverse to the longitudinal direction (X), and the other two of the light emitting units 31 of the first inner light emitting set 34 and the other one of the light emitting units 31 of the second inner light emitting set 35 are disposed on the other side of the imaginary line.

The light transmissible cover 40 is coupled to the base wall 11 for covering the lighting unit 30. The side covers 50 are opposite to each other in the longitudinal direction (X), are coupled to the heat-dissipating unit 10 and the light transmissible cover 40, and cooperate with the heat-dissipating unit 10 and the light transmissible cover 40 to form a compartment 51. The lighting unit 30 is confined in the compartment 51. The waterproofing seals 60 are provided on each of the side covers 50 for sealing the compartment 51. The power supply line 70 has one end extending to the lamp post 100 through the through hole 113 and the bore 52 of one of the side covers 50, and the other end electrically coupled to the board strips 21. The waterproof connector 80 is disposed on the base wall 11 of the heat-dissipating unit 10 for coupling of the power supply line 70 to the board strips 21.

It is to be noted that in this embodiment, the heat-dissipating unit 10 is made from aluminum extrusion, and is coated with a heat-conductive insulation layer such as by subjecting the heat-dissipating unit 10 to anodic oxidation treatment for anti-corrosion. Each of the light emitting units 31 is a light emitting diode (LED). Also, the present invention can be configured into a solar lighting apparatus by using a solar power cell as a power supply source.

Figure 5:
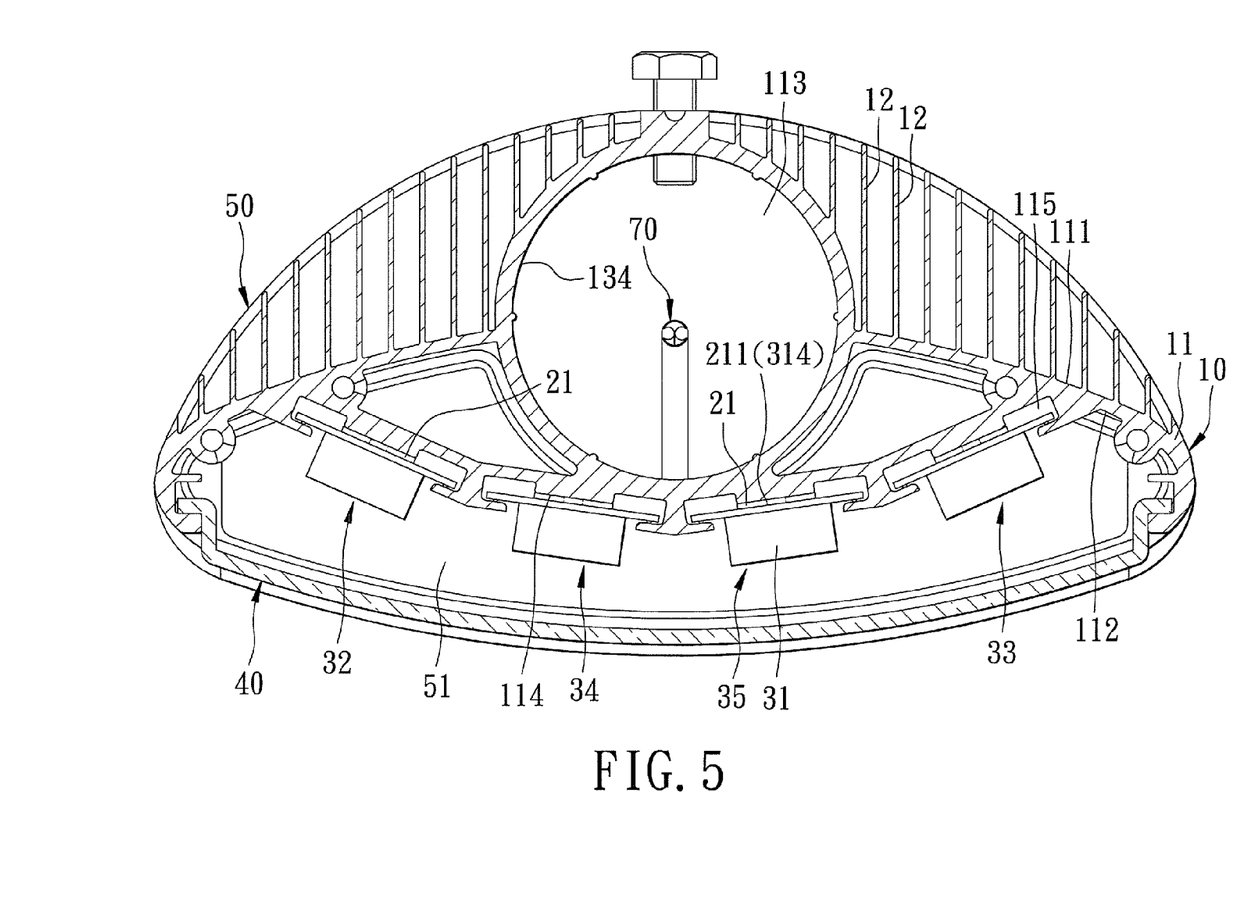
FIG. 5 is a sectional view of the first preferred embodiment of the lighting apparatus according to the present invention.
Figure 6:
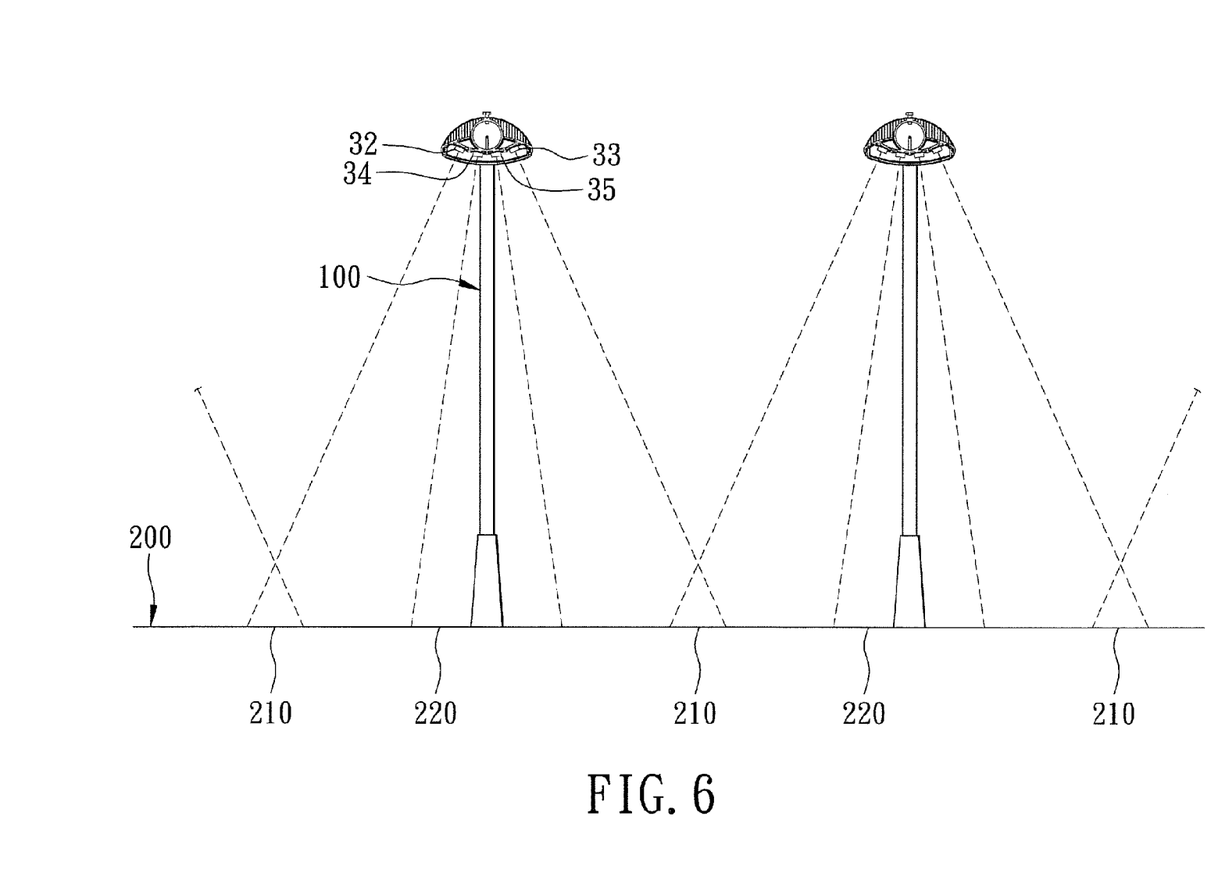
FIG. 6 is a schematic diagram showing two adjacent lighting apparatuses of the first preferred embodiment in a state of projecting light onto a street.
Figure 7:
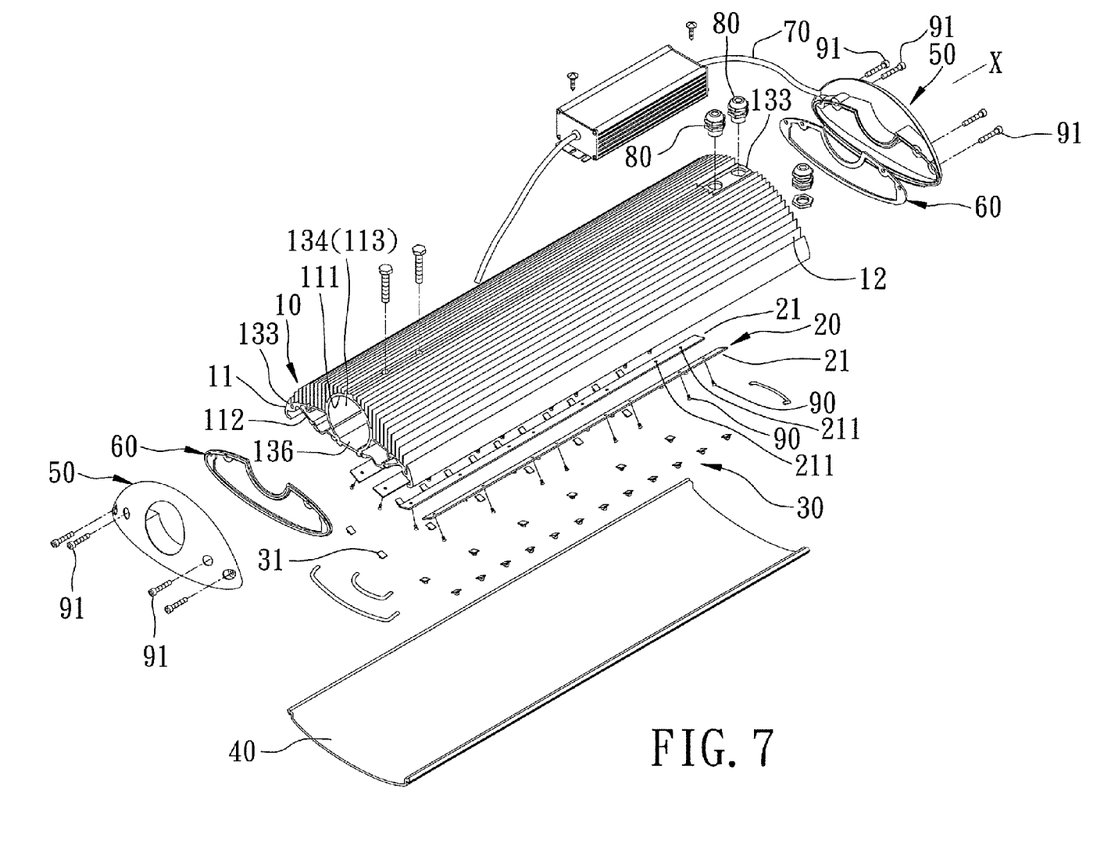
FIG. 7 is an exploded perspective view of the second preferred embodiment of the lighting apparatus according to the present invention.
Figure 8:
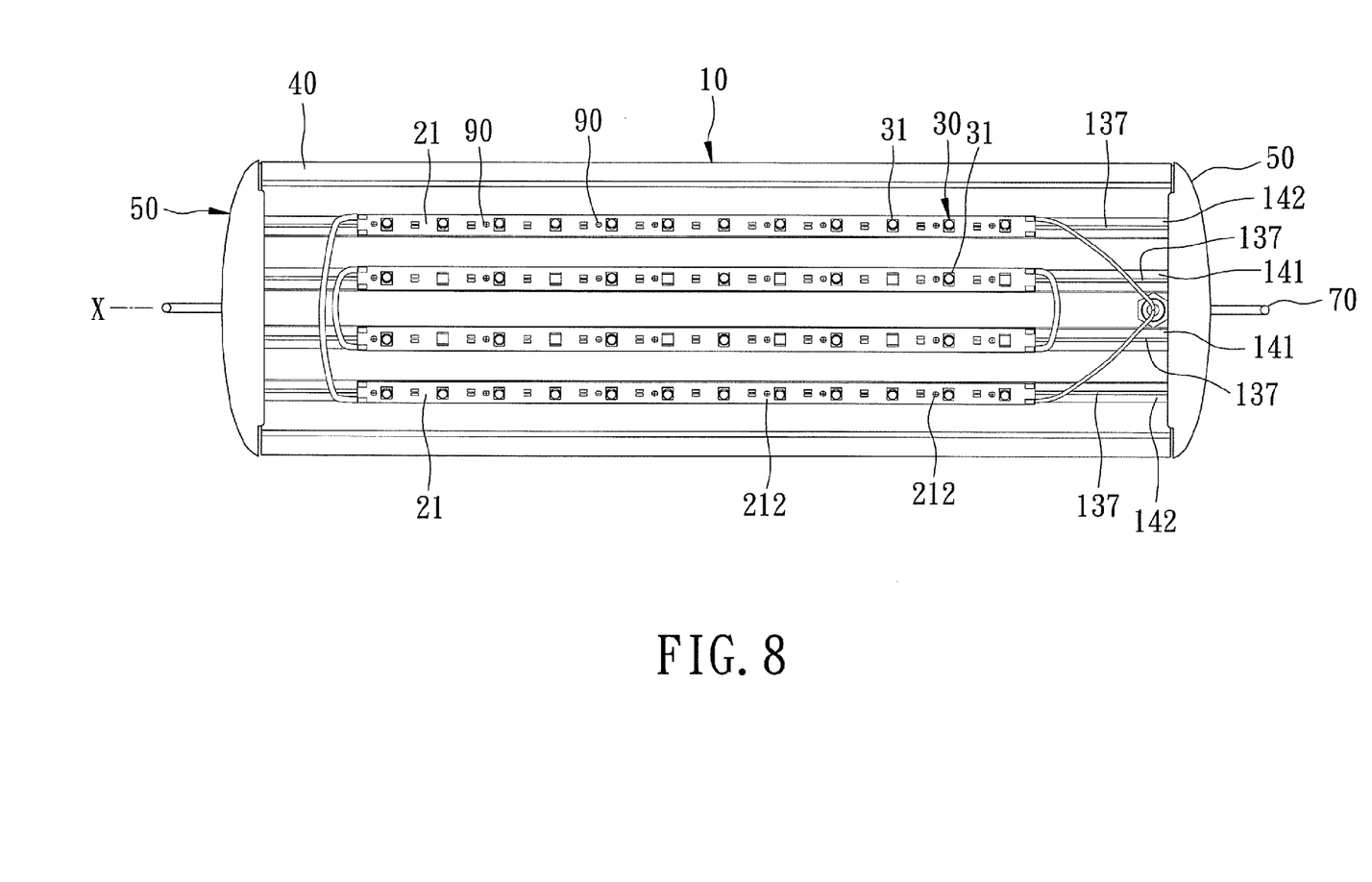
FIG. 8 is a schematic view of the second preferred embodiment to illustrate arrangement of the light emitting sets in the lighting apparatus.
Figure 9:
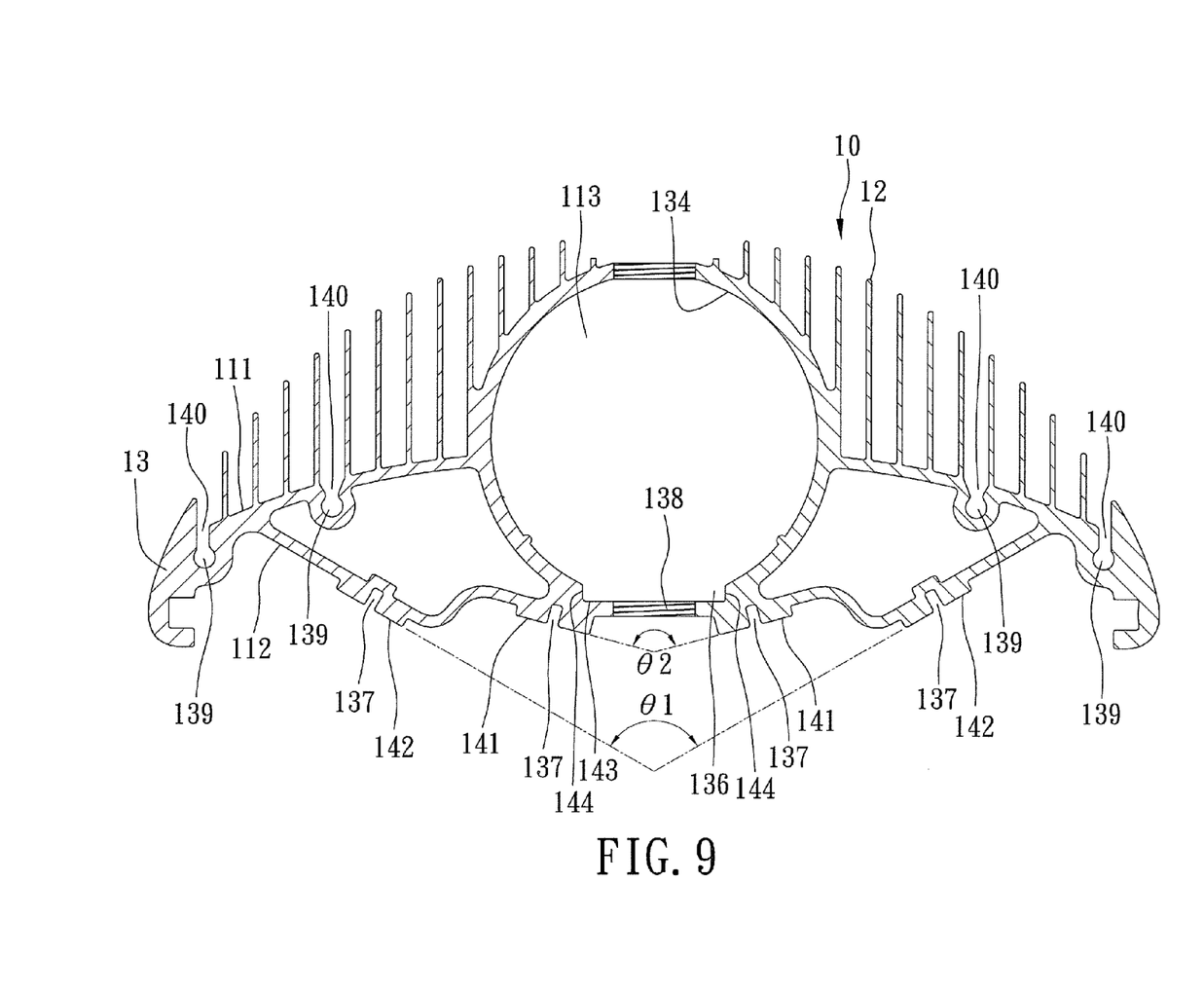
FIG. 9 is a sectional view of the second preferred embodiment to illustrate a pair of outer mounting parts and a pair of inner mounting parts of a bottom side of a base wall.
Figure 10:
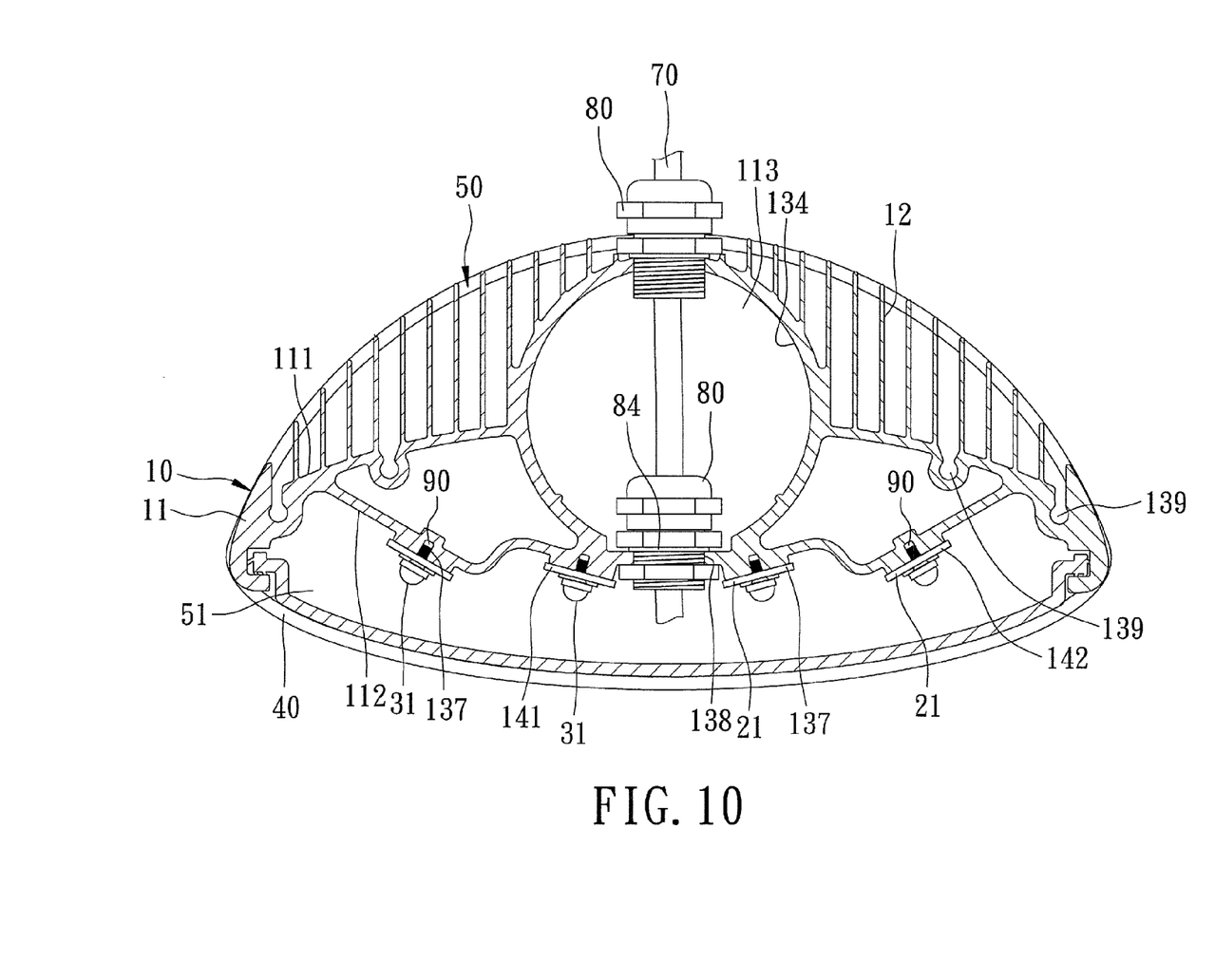
FIG. 10 is a sectional view of the second preferred embodiment of the lighting apparatus according to the present invention.

Reference is now made to FIGS. 4, 5, and 6. The lighting unit 30 is mounted on the convex surface portion 114 so that the outer pair of the light emitting sets 32, 33 project light towards a region that is relatively farther than the region illuminated by the first and second inner light emitting sets 34, 35. The intensity of the light outputted by each of the light emitting units 31 can be calculated by the abovementioned equation ($E=F/4\pi R^2$). In order to minimize the light intensity variations across different regions 220, 210 on the street 200 while achieving an optimal illumination result, a larger number of the light emitting units 31 is used in the outer pair of the light emitting sets 32, 33 than that in the first and second inner light emitting sets 34, 35. In effect, a light contrast ratio of 0.354 can be obtained, which is an improvement over the prior art (a ratio of less than 0.3).

FIGS. 7, 8, 9, and 10 illustrate the second preferred embodiment of the present invention. The second preferred embodiment differs from the first preferred embodiment in that the bottom side 112 of the base wall 11 is formed with a pair of outer mounting parts 142 and at least one inner mounting part 141 disposed between the outer mounting parts 142. The outer and inner mounting parts 142, 141 extend in the longitudinal direction. Moreover, in this embodiment, the lighting apparatus further comprises a waterproofing ring 84, a set of assembly screws 91, and a set of self-tapping screws 90.

In this embodiment, the outer mounting parts 142 are configured to form a first angle $\theta_1$ that is not greater than 120 degrees therebetween. The bottom side 112 is formed with a pair of the inner mounting parts 141 that are configured to form a second angle $\theta_2$ therebetween. The second angle $\theta_2$ is less than 180 degrees and is greater than the first angle $\theta_1$. Each of the four board strips 21 of the circuit board unit 20 is mounted to a respective one of the inner and outer mounting parts 141, 142.

Each of the inner and outer mounting parts 141, 142 is formed with a groove 137 that extends in the longitudinal direction. Each of the board strips 21 is formed with a plurality of fastener holes 212 that are spaced apart from each other in the longitudinal direction. In this embodiment, instead of having the board strips 21 disposed in a respective one of the recesses 115, the board strips 21 are secured to the base wall 11 through a corresponding one of the grooves 137. In particular, each of the self-tapping screws 90 extends through a respective one of the fastener holes 212 and into a corresponding one of the grooves 137 in the inner and outer mounting parts 141, 142 for securing the board strips 21 to the base wall 11.

The hole-defining wall 134 is formed with an indentation 136 that extends in the longitudinal direction, and has a planar bottom part 143 and a pair of upright parts 144 that respectively extend from opposite sides of the planar bottom part 143 and that cooperate with the planar bottom part 143 to define the indentation 136. The planar bottom part 143 is formed with a screw hole 138 therethrough. In this embodiment, the waterproof connector 80 is connected threadedly to the hole-defining wall 134 at the screw hole 138. The waterproofing ring 84 is clamped between the waterproof connector 80 and the planar bottom part 143.

Each of the lateral ends 133 is formed with a set of threaded holes 139 that extend in the longitudinal direction, and a plurality of notches 140 that extend from the top side 111 of the base wall 11 to the threaded holes 139. In this embodiment, there are four threaded holes 139 with four corresponding notches 140, and four assembly screws 91. Each of the assembly screws 91 extends through a corresponding one of the side covers 50 and engages a respective one of the threaded holes 139 for fastening the side covers 50 to the heat-dissipating unit 10.

In this embodiment, the second angle $\theta_2$ is substantially equal to 150 degrees, and the first angle $\theta_1$ is substantially equal to 120 degrees. Each of the light emitting units 31 is a light-emitting diode (LEDs). Due to the different angles ($\theta_1$ and $\theta_2$) formed by the outer and inner mounting parts 142, 141, the type of the LEDs disposed on the outer and inner mounting parts 142, 141 would also be different. For instance, the light emitting units 31 (LEDs) disposed on the outer mounting parts 142 are recommended to radiate an effective light angle in a range that is less than 90 degrees, whereas the light emitting units 31 (LEDs) disposed on the inner mounting parts 141 are recommended to radiate an effective light angle in a range that is greater than 90 degrees. Thus, in this embodiment, each of the LEDs disposed on the outer mounting parts 142 has an effective light angle of 70 degrees and each of the LEDs disposed on the inner mounting parts 141 has an effective light angle of 120 degrees. Consequently, the LEDs on the outer mounting parts 142 ($\theta_1$=120 degrees) are able to project light in a range of 8 to 15 meters. The LEDs on the inner mounting parts 141 ($\theta_2$=150 degrees) are able to project light in a range of 5 to 8 meters. As a result, the lighting apparatus is capable of projecting the light in a balanced manner at different points of an illuminated area so as to promote road safety.

While the present invention has been described in connection with what are considered the most practical and preferred embodiments, it is understood that this invention is not limited to the disclosed embodiments but is intended to cover various arrangements included within the spirit and scope of the broadest interpretation so as to encompass all such modifications and equivalent arrangements.

What is claimed is:

1. A lighting apparatus comprising:
   a heat-dissipating unit including a base wall that extends in a longitudinal direction, said base wall having a top side and a bottom side formed with a convex surface portion that is opposite to said top side;
   a circuit board unit disposed on said base wall, and including a plurality of board strips, each of which is formed with a plurality of spaced-apart holes; and
   a lighting unit including an outer pair of light emitting sets and at least one other light emitting set disposed between said outer pair of said light emitting sets, said light emitting sets of said lighting unit being disposed on said convex surface portion and being coupled electrically to said circuit board unit, each of said light emitting sets of said lighting unit having a plurality of light emitting units that are spaced apart from each other in the longitudinal direction, wherein a number of said light emitting units in each of said light emitting sets in said outer pair is larger than a number of said light emitting units in each of said at least one other light emitting set of said lighting unit, wherein each of said light emitting units extends though a respective one of said holes in said board strips and includes a metal heat-dissipating plate contacting said convex surface portion of said base wall of said heat-dissipating unit.

2. A lighting apparatus comprising:
   a heat-dissipating unit including a base wall that extends in a longitudinal direction, said base wall having a top side and a bottom side that is opposite to said top side and that is formed with a pair of outer mounting parts and a pair of inner mounting parts disposed between said outer mounting parts, said outer and inner mounting parts extending in the longitudinal direction, said outer mounting parts being configured to form a first angle that is than substantially equal to 120 degrees therebetween, said inner mounting parts being configured to form a second angle that is substantially equal to 150 degrees therebetween, each of said inner and outer mounting parts being formed with a groove that extends in the longitudinal direction;
   a circuit board unit disposed on said base wall, and including four board strips, each of which is formed with a plurality of fastener holes that are spaced apart from each other in the longitudinal direction;
   a plurality of self-tapping screws, each of which extends though a respective one of said fastener holes and into a corresponding one of said grooves in said inner and outer mounting parts for securing said board strips to said base wall; and
   a lighting unit including an outer pair of light emitting sets and a pair of inner light emitting sets disposed between said outer pair of said light emitting sets, said outer pair of said light emitting sets being respectively disposed on said board strips that are mounted to said outer mounting parts, said inner light emitting sets being respectively disposed on said board strips that are mounted to said inner mounting parts, each of said light emitting sets of said lighting unit having a plurality of light emitting units that are spaced apart from each other in the longitudinal direction, wherein a number of said light emitting units in each of said light emitting sets in said outer pair is larger than a number of said light emitting units in each of said inner light emitting sets of said lighting unit.

3. The lighting apparatus as claimed in claim 2, wherein said heat-dissipating unit further includes a plurality of heat-dissipating fins formed on said top side of said base wall.

4. The lighting apparatus as claimed in claim 2, wherein:
   said base wall further has a pair of lateral ends that extend between said top and bottom sides thereof and that are opposite to each other in the longitudinal direction, and a though hole that extends from one of said lateral ends to the other of said lateral ends and that is defined by a hole-defining wall;
   said hole-defining wall being formed with an indentation that extends in the longitudinal direction, and having a planar bottom part and a pair of upright parts that respectively extend from opposite sides of said planar bottom part and that cooperate with said planar bottom part to define said indentation;
   said planar bottom part being formed with a screw hole therethrough;
   said lighting apparatus further comprising a waterproof connector connected threadedly to said hole-defining wall at said screw hole.

5. The lighting apparatus as claimed in claim 4, further comprising a waterproofing ring clamped between said waterproof connector and said planar bottom part.

6. The lighting apparatus as claimed in claim 4, further comprising:
   a light transmissible cover coupled to said base wall for covering said lighting unit; and
   a pair of side covers coupled to said heat-dissipating unit and said light transmissible cover, opposite to each other in the longitudinal direction, and cooperating with said heat-dissipating unit and said light transmissible cover to form a compartment, said lighting unit being confined in said compartment.

7. The lighting apparatus as claimed in claim 6, wherein:
   each of said lateral ends of said base wall is formed with a set of threaded holes that extend in the longitudinal direction, and a plurality of notches that extend from said top side of said base wall to said threaded holes;
   said lighting apparatus further comprising a set of assembly screws, each of which extends though a corresponding one of said side covers and engages a respective one of said threaded holes for fastening said side covers to said heat-dissipating unit.

\* \* \* \* \*